Feb. 24, 1948.            I. HILL ET AL            2,436,770
GARDEN AND APPARATUS FOR SEPARATING THE SOILS AND PLANTS THEREIN
Filed Sept. 4, 1943
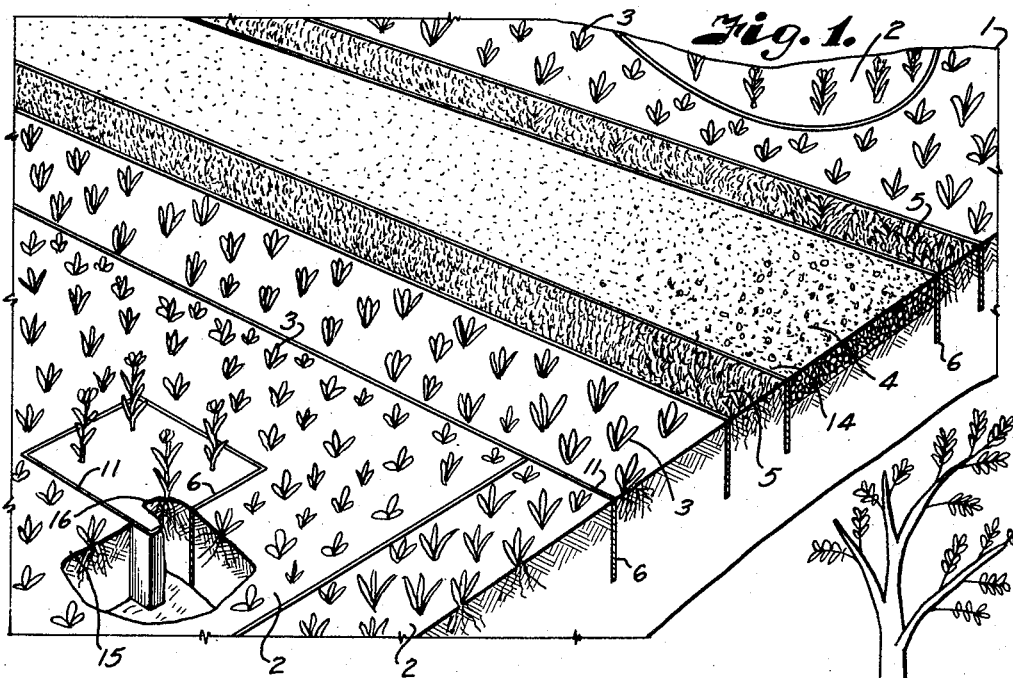
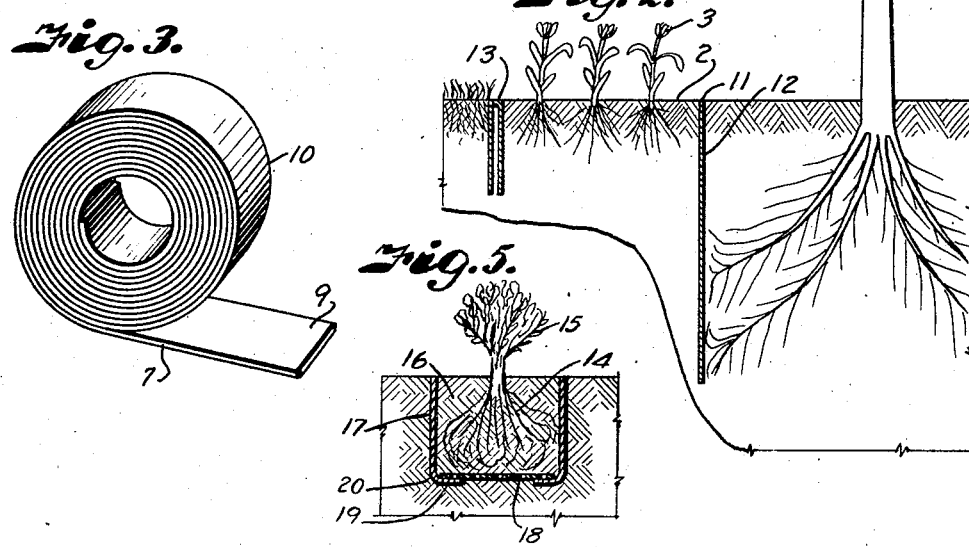
INVENTORS
*Irving Hill*, and
*Walter Nelson*.
BY
*Arthur C. Brown*
ATTORNEY Patented Feb. 24, 1948

2,436,770

UNITED STATES PATENT OFFICE 2,436,770

GARDEN AND APPARATUS FOR SEPARATING THE SOILS AND PLANTS THEREIN

Irving Hill and Walter Nelson, Lawrence, Kans., assignors of one-third to Margaret Hill Ravndal, Washington, D. C., one-third to Elspeth Hill Cowgill, Louisville, Ky., and one-third to Justin D. Hill, Lawrence, Kans.

Application September 4, 1943, Serial No. 501,238

2 Claims. (Cl. 47—33)

This invention relates to gardens and plants and to apparatuses for separating the soils and/or plants and for providing edging or borders for defining garden plots, walkways and the like, and more particularly to gardens having separators or borders extending into the earth. The principal object of the invention is to provide a border for separating earth formations, retarding and segregating the propagation of roots, weeds, grasses and the like and for making a garden or the like more attractive and productive.

A great deal of difficulty has been encountered by gardeners in their efforts to form attractive landscapes by the use of variously shaped beds having varieties of plants in the respective beds and particularly where different types of fertilizer are recommended for the various plants. Other difficulties have been encountered in controlling root propagation of weeds, grasses and the like adjacent these beds and regardless of the efforts to prevent such undesirable growth they appear in the beds in the gardens. The roots of the weeds and the like spread under the garden bed and shoots from such roots grow in the cultivated area.

Attempts have been made to control undesirable growth by placing borders around garden plots but in most instances the border material is of metal and is subject to corrosion and rapid deterioration from the chemicals in the soil. The metallic borders used in the attempts project above the ground or appear, due to washing of the earth, to present a hazard to mowing machines operated on the grasses adjacent these cultivated gardens. Other types of separators or borders such as brick, concrete or the like also damage mowing machines and since they are not impervious will not permit the use of one type of fertilizer or soil in a bed having plants therein requiring such soil treatment if the adjacent bed contains plants requiring different treatment. There is no definite separation of the soil in such a bed. Another defect in such types of borders is that they are pervious and the small roots of weeds, grasses and the like gradually push through the openings in the separators or borders and cause these shoots to grow into the cultivated garden enclosed by such borders.

Other objects of the invention are therefore, to provide a border which is relatively pliable and may be stored in rolls and may be readily placed in position in the ground and conform to any shaped garden plot; to provide a fiber paper or board which is saturated, impregnated, coated, laminated and/or treated for ductility and strength by material resistant to water, acid, alkalies, plant foods, corrosion and the like; to provide a fiber paper or board treated with asphalt which may be either pliable or stiff to form economical separations of plants for controlling root spreading between grass, weeds, and trees in garden beds; to provide a border permitting separate soil conditioning for each plant or bed; to provide a border for separating and protecting different types of soil such as acid and alkali soils; to provide a fiber paper or board for holding a line along gravel walkways, stepping stones or other shaped edges; to form an edging and separator for gardens and the like of asphalt treated fiber paper or board that will be durable and may be quickly and easily removed and reset; to provide a protective enclosure for a root ball of a plant or the like; to provide for maintaining root identity of plants; to provide a separator for enclosing a plant root ball during growth which may be used for shipping or moving said plant; and to provide a convenient, economical, and efficient separator or border of the character and for the purpose noted.

In accomplishing these and other objects of the present invention, we have provided improved details of structure, the preferred form of which is illustrated in the accompanying drawings, wherein:

Fig. 1 is a perspective view of a garden plot partly in section in which borders and separators embodying the present invention are used.

Fig. 2 is a sectional view of a plot of earth particularly showing the use of the border and separators for retardation of root propagation.

Fig. 3 is a perspective view of the separator or border material in a roll for shipping, storage or other handling.

Fig. 4 is a transverse section through a form of border material consisting of a treated fiber corrugated board.

Fig. 5 is a sectional view of a plant root ball protected by the separator material.

Referring more in detail to the drawing:

1 designates a garden having various beds 2 containing cultivated plants 3, a walkway 4 of gravel or the like, with grass borders 5, all of which plots are separated by separators or borders 6. The particular shapes or arrangements of the beds in the garden plot are not features of our invention. The separators or borders 6 are preferably formed of paper or fiber board 7 of laminated or corrugated construction saturated, impregnated or coated, as at 8, with a material such as asphalt that is resistant to water, acid, alkalies, plant food, corrosion and the like.

One suitable method of preparation of such separator is by dipping or otherwise coating or impregnating a laminated or corrugated fiber paper or board of conventional structure with the asphalt or like material 8, the treated board preferably being of such ductility that it can be formed in strips 9 and rolled as at 10 for ease in handling, shipping or storage.

One method of insertion or use of the separator material for a separator or an edging in a garden bed is to unroll the strip and insert same in a ditch or other depression formed by a spade or the like which may be inserted a suitable depth around the garden bed of any desired shape or size, the fiber paper or board separator readily being conformed by bending to the desired shape as it is inserted, however, the garden bed may be excavated and the interior of the wall thereof lined with a strip or strips of the treated fiber paper or board and the bed refilled with a suitable treated earth for the plants to grow therein. If desired the separator material may project slightly above the level of the ground, however, it is preferable that it be inserted for the full width of the strip so the upper edge will be even with the ground level but preferably provide no upwardly projecting portions to affect the general contour of the ground or interfere with the attractive appearance of the garden bed. The transverse corrugations of the inner member are arranged vertically and the spaces between the outer members and the corrugations form vertical openings or passages for subsurface drainage of surface water from the garden beds. The width of the strip is preferably cut so that it will extend into the ground below the normal root depth of the weeds, grasses or other plants in and adjacent the bed whereby the roots in this normal propagation engage the sides of said separators and are turned away without growing into or under the cultivated bed.

Where trees and the like are in close proximity to the garden plot, the strip may be widened as at 12, to prevent the growing tree roots from encroaching upon the cultivated bed. In normal gardening where there are no trees near by, narrower strips may be satisfactorily and preferably are used to care for the normal depth of the root growth of the adjacent plants. If it is desired or necessary to provide additional strength to control large roots or care for other abnormal conditions, the strip may be doubled, as at 13, or two strips may be placed side by side to provide the necessary strength. Since the fiber board is preferably pliable and does not deteriorate with use, it may be readily removed and reset to provide for changing the shape of the garden plot or it may be removed and rolled for storage in a suitable place for future use.

In Fig. 5 a form of use of our separator is shown which is particularly adapted for use in nurseries and breeders' gardens where the roots of each variety of plant may be separated as to assure that the roots dug are true as to variety. A rank growing variety of plant may be confined adjacent a slow growing variety of plant and the root identity of each preserved or seedlings may be separated to avoid mixing.

In this form of use of our invention the roots 14 of a plant or shrub 15 are enclosed in a ball of earth 16 and said earth provided with a peripheral covering 17 of impregnated fiber board preferably of the same construction as the board 7. The plant may be set out with the peripheral covering open, slit or folded at the bottom. However we prefer that the bottom of the ball of earth is covered with a perforated board 18 and the lower ends 19 of the covering 17 folded over the board 18 as at 20. This structure provides a potted root system for nurseries or the like which prevents weed roots from entering the root and earth ball of the cultivated plants and provides a root and earth ball covering which facilitates the removal of the plant from the nursery bed and serves as a wrapper for the root and earth ball for use in moving or shipping the plant.

It is believed to be obvious, since the treated fiber paper or board is impervious, that we have provided a garden earth separator and/or border capable of retarding root propagation maintaining the edges of gravel walkways and the like, as at 14, and separating different types of earth, as at 15 and 16, as well as providing means for permitting different cultivation of plants in adjacent beds. It is also believed apparent that we have provided a convenient, economical and efficient border of material having durable qualities that is capable of being readily placed around a garden plot yet which is easily removed for storage or reuse.

What we claim and desire to secure by Letters Patent is:

1. In a garden, a plurality of garden beds having various plants therein, and an asphalt treated fiber board arranged edgewise around the beds and extending from the ground level to below the normal root depth of said plants, said board having outer surfaces and transverse corrugations therebetween forming vertical openings for subsurface drainage of surface water from said beds.

2. In a garden, a plurality of garden beds having various plants and types of earth therein, and means for separating the respective earths of the respective beds including a strip member treated with a waterproof material impervious to soil chemicals, said strip member extending edgewise into the ground from the level thereof to below the root depth of the plants in the respective beds, and said strip member having outer surfaces and transverse corrugations therebetween forming vertical openings for subsurface drainage of surface water from said beds.

IRVING HILL.
WALTER NELSON.

REFERENCES CITED

The following references are of record in the file of this patent:

UNITED STATES PATENTS

| Number | Name | Date |
|---|---|---|
| 645,518 | Watt | Mar. 13, 1900 |
| 861,046 | Norum | July 23, 1907 |
| 1,197,106 | Cox | Sept. 5, 1916 |
| 1,765,796 | Kirschbraun | June 24, 1930 |
| 1,977,021 | Spencer | Oct. 16, 1934 |
| 2,073,695 | Haysler | Mar. 16, 1937 |
| 2,104,060 | Spafford | Jan. 4, 1938 |
| 2,184,904 | Boehme | Dec. 26, 1939 |
| 2,232,005 | Jones | Feb. 18, 1941 |

FOREIGN PATENTS

| Number | Country | Date |
|---|---|---|
| 15,425 | Great Britain | 1886 |
| 100,636 | Australia | Mar. 24, 1937 |
| 696,268 | France | Oct. 13, 1930 |